(12) United States Patent
Naito et al.

(10) Patent No.: US 10,770,933 B2
(45) Date of Patent: Sep. 8, 2020

(54) STATOR FIXING STRUCTURE

(71) Applicant: MEIDENSHA CORPORATION, Tokyo (JP)

(72) Inventors: Yoshiharu Naito, Tokyo (JP); Koji Nagata, Tokyo (JP); Takashi Abe, Tokyo (JP)

(73) Assignee: MEIDENSHA CORPORATION, Tokyo (JP)

( * ) Notice: Subject to any disclaimer, the term of this patent is extended or adjusted under 35 U.S.C. 154(b) by 29 days.

(21) Appl. No.: 14/428,793

(22) PCT Filed: Sep. 18, 2013

(86) PCT No.: PCT/JP2013/075072
§ 371 (c)(1),
(2) Date: Mar. 17, 2015

(87) PCT Pub. No.: WO2014/046101
PCT Pub. Date: Mar. 27, 2014

(65) Prior Publication Data
US 2015/0249368 A1    Sep. 3, 2015

(30) Foreign Application Priority Data

Sep. 18, 2012 (JP) .................................. 2012-203881

(51) Int. Cl.
*H02K 1/18* (2006.01)
(52) U.S. Cl.
CPC ............... *H02K 1/185* (2013.01); *H02K 1/18* (2013.01)
(58) Field of Classification Search
CPC .................................. H02K 1/185; H02K 1/18
(Continued)

(56) References Cited

U.S. PATENT DOCUMENTS 3,343,013 A * 9/1967 Wightman ............... H02K 5/15
                                                    310/216.132
3,783,318 A * 1/1974 Widstrand ............... H02K 1/16
                                                    310/216.014
(Continued)

FOREIGN PATENT DOCUMENTS

DE         713 820 C    11/1941
EP       1 139 542 A2   10/2001
(Continued)

OTHER PUBLICATIONS

Translation of foreign document DE 713820 C (Year: 1941).*
Translation of foreign document JP 2007221853 A (Year: 2007).*
Extended European Search Report dated Apr. 22, 2016, 7 pages.

*Primary Examiner* — Alex W Mok
(74) *Attorney, Agent, or Firm* — Foley & Lardner LLP

(57) ABSTRACT

A stator fixing structure is configured such that a projection (2) is provided to project from the outer periphery of a stator (1), which is formed by stacking a plurality of plate-shaped members, in a radial direction while a fastening member (11) is inserted into a fastening member inserting hole (3) formed in the projection (2) so as to fix the stator (1) to a frame (8), and the outer peripheral surface of the stator (1) except the projection (2) is fixed to the inner peripheral surface of the frame (8) by shrink fitting. A dent (4) is formed at the root of the projection (2), thereby reducing the proportion of the projection (2) in the periphery of the stator and increasing the contact area between the frame (8) and the stator (1) for the shrink fit part (7). Thus, the stator (1) can be effectively fastened to the frame (8).

4 Claims, 3 Drawing Sheets

(58) Field of Classification Search
USPC .................................................. 310/216.113
See application file for complete search history.

(56) References Cited

U.S. PATENT DOCUMENTS

| | | | | |
|---|---|---|---|---|
| 3,807,040 A * | 4/1974 | Otto | ....................... | H02K 1/185 |
| | | | | 29/522.1 |
| 3,867,654 A * | 2/1975 | Otto | ......................... | H02K 5/04 |
| | | | | 310/216.132 |
| 4,114,019 A * | 9/1978 | Sandor | .................. | B23K 9/025 |
| | | | | 219/137 R |
| 6,362,553 B1 * | 3/2002 | Nakahara | ................. | H02K 1/14 |
| | | | | 310/216.004 |
| 6,398,415 B1 * | 6/2002 | Ibe | ....................... | F16C 23/045 |
| | | | | 384/214 |
| 2004/0140729 A1 * | 7/2004 | Niimi | .................... | H01R 39/04 |
| | | | | 310/233 |
| 2005/0278938 A1 * | 12/2005 | Harada | ................. | B21K 25/00 |
| | | | | 29/598 |
| 2006/0279160 A1 | 12/2006 | Yoshinaga et al. | | |
| 2011/0221294 A1 | 9/2011 | Sate et al. | | |
| 2012/0126641 A1 * | 5/2012 | Murakami | .............. | H02K 9/19 |
| | | | | 310/54 |

FOREIGN PATENT DOCUMENTS

| | | | |
|---|---|---|---|
| JP | 2003-274579 A | | 9/2003 |
| JP | 2006-087222 A | | 3/2006 |
| JP | 2007221853 A | * | 8/2007 |
| JP | 2009-201235 A | | 9/2009 |
| JP | 4775020 B2 | | 9/2011 |
| JP | 2011-217434 A | | 10/2011 |

* cited by examiner

[FIG. 1]
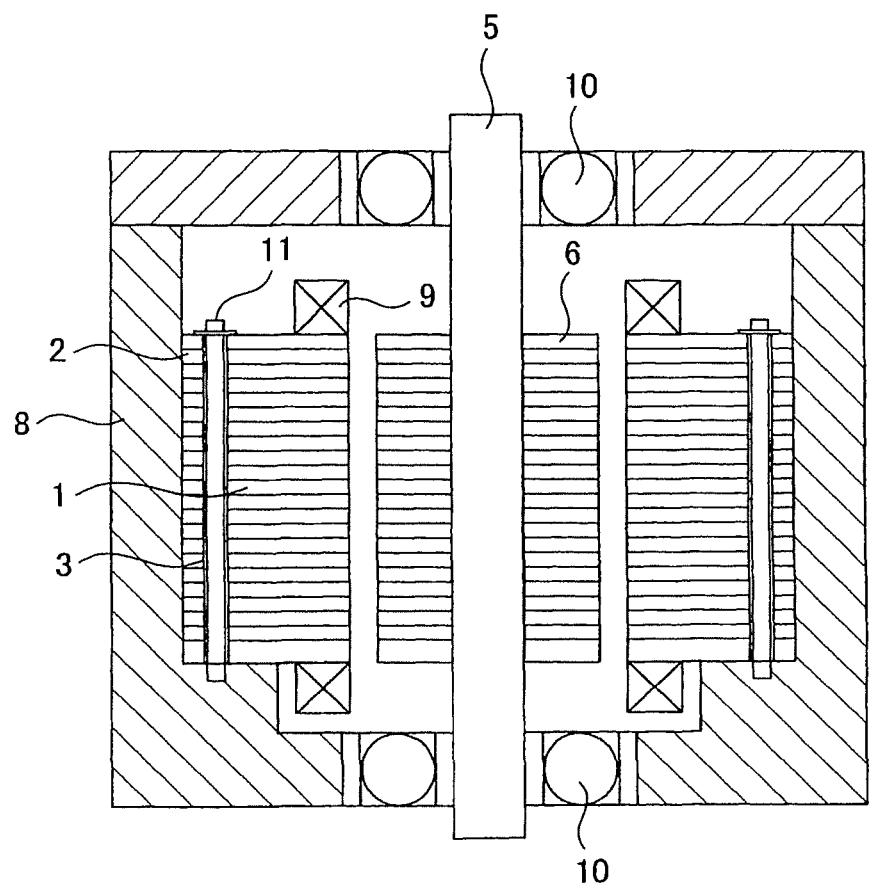

[FIG. 2]
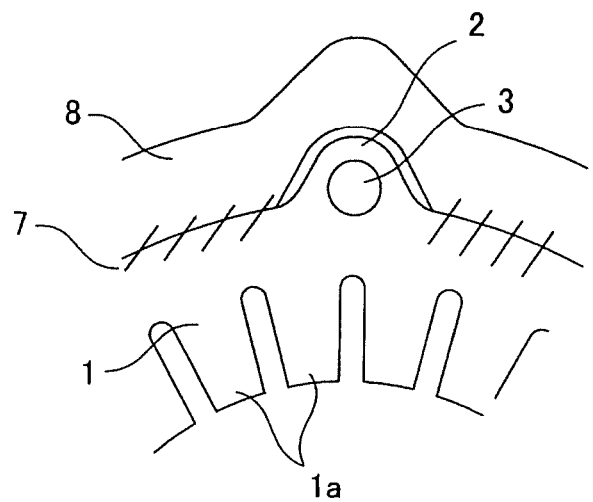
[FIG. 3]
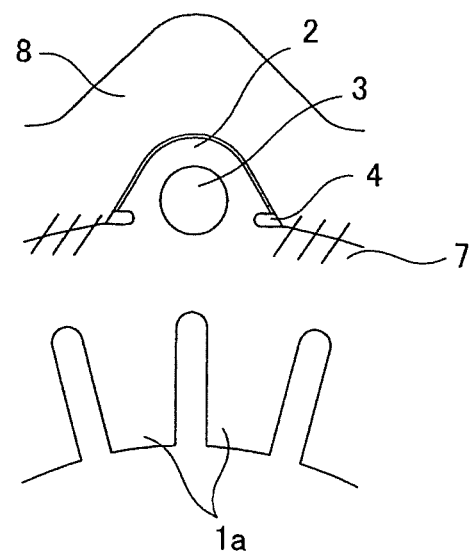

[FIG. 4]
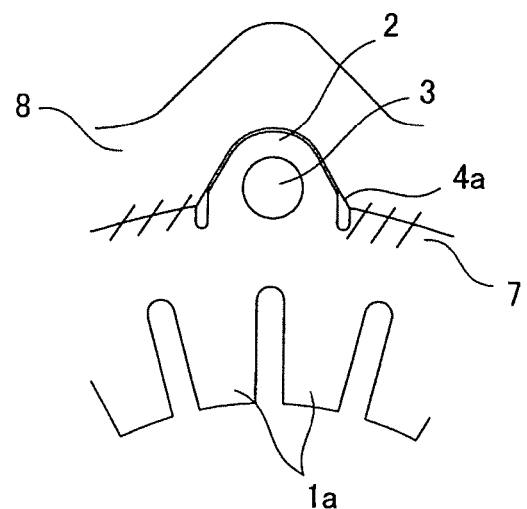
[FIG. 5]
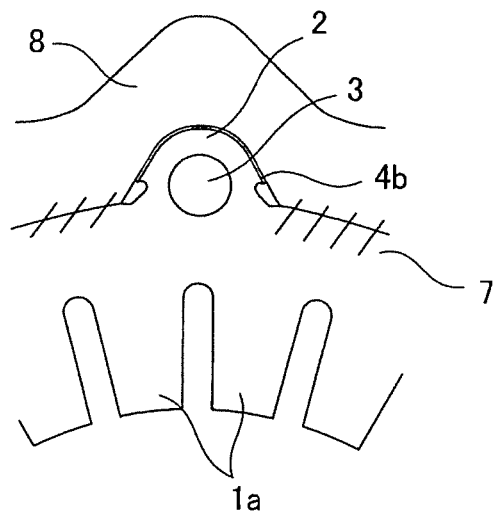

STATOR FIXING STRUCTURE

TECHNICAL FIELD

The present invention relates to a stator fixing structure for fixing a stator to a frame of a rotary machine.

BACKGROUND ART

A stator fixing structure for fixing a stator to a frame of a rotary machine has heretofore been known.

For example, Patent Document 1 discloses in FIG. 4 and paragraphs [0009] to [0014] that projecting parts projecting in a radial direction are provided to an outer peripheral portion of a stator formed by stacking multiple plate-shaped members (electromagnetic steel sheets), the stator is fixed to a frame (also referred to as a base) by inserting fastening members into fastening-member insertion holes formed in these projecting parts, and the inner peripheral surface of the frame facing opposite ends of the root of each projecting part of the stator (end portions of skirts of the projecting part in the circumferential direction) are tightly fixed to the outer peripheral surface of the stator. In this way, entrance of a fixing agent through the gap between the multiple plate-shaped members is prevented.

PRIOR ART DOCUMENT

Patent Documents

Patent Document 1: Japanese Patent No. 4775020
Patent Document 2: Japanese Patent Application Publication No. 2006-87222

SUMMARY OF THE INVENTION

Problems to be Solved by the Invention

FIG. 2 and paragraph [0009] of Patent Document 1 describe a method in which the stator is fastened to the frame with fastening members. However, with only the fastening with fastening members, it may be impossible to fully receive rotational force applied in the circumferential direction of the stator with a rotating magnetic field by electromagnetic force produced upon energization of stator coils. As a result, the stator may be deformed or rotated.

Moreover, there is a fastening method using shrink fitting to fix a frame and a stator, in addition to the above fastening method using fastening members. In this fastening method additionally using fixing by shrink fitting, if the stator includes projecting parts projecting in the radial direction like those in FIG. 4 of Patent Document 1, spaces between curved portions of each projecting part of the stator toward which the skirts at the root of the projecting part expand and portions of the frame facing these curved portions cannot be utilized as the interference for the shrink fitting due to issues on dimensional accuracy and the like. For this reason, the stator and the frame are fixed generally by allowing no contact and leaving a clearance between the outer peripheral surface of the projecting part of the stator and the inner peripheral surface of the frame facing the projecting part.

Specifically, as shown in FIG. 2, tooth parts $1a$ on which to wind coils (not shown) are formed on the inner peripheral side of a stator 1, while projecting parts 2 projecting in the radial direction are provided on the outer periphery of the stator 1. The stator 1 is fixed to a frame 8 by inserting fastening members (not shown; e.g. bolts) into fastening-member insertion holes 3 formed in these projecting parts 2. At the outer periphery of the stator 1, the outer peripheral surface of a portion thereof excluding the projecting parts 2 and the inner peripheral surface of the frame 8 are fixed to each other by shrink fitting. The contacted portions of the stator 1 and the inner peripheral surface of the frame 8 fixed by shrink fitting as described above will be referred to as shrink-fitted portions 7 (illustrated with oblique lines in the drawing). In FIG. 2, as in FIG. 4 of Patent Document 1, each projecting part 2 is formed in a substantially triangular shape. Thus, the wider the skirts of the projecting part 2, the larger the proportion of the projecting part 2 on the outer periphery of the stator 1 and the narrower the shrink-fitted portions 7. For this reason, the area for fixing the stator 1 and the frame 8 at the shrink-fitted portions 7 is reduced, i.e. the area of contact between the outer peripheral surface of the stator 1 and the inner peripheral surface of the frame 8 is reduced. This leads to a problem such as failing to effectively ensure the fastening against the rotational force of the rotor.

Further, in the case where the stator 1 is fixed to the frame 8 by shrink fitting, the outer peripheral surface of the stator 1 is subjected to constricting force produced due to the fixing to the frame 8 by shrink fitting.

If this constricting force is too large, a problem such as deformation of the stator 1 may occur in the case of a structure as that in FIG. 4 of Patent Document 1 because there is no portion for the constricting force to escape and the stress due to the constriction concentrates at the root of the projecting part 2 of the stator 1.

Note that paragraphs [0006] to [0007] of Patent Document 2 disclose a structure in which, for fixing a stator to a metal frame by shrink fitting, swaging portions are disposed near positions on the outer periphery of the stator where the stator is fitted to the metal frame. When the fixing by swaging is done, outer peripheral portions of the stator expand in the radial direction, thus being tightly fixed to the frame and preventing deformation of the stator. It is, however, necessary to appropriately adjust the swaging force which is determined in advance based on the design, and the tightly fixing force corresponding to the amount of the expansion. It is difficult to appropriately adjust the swaging force and the tightly fixing force at the same time. Thus, there is a problem in that the manufacturing is difficult.

Means for Solving the Problems

A stator fixing structure according to a first aspect of the invention for solving the above problems provides a stator fixing structure in which: a projecting part projecting in a radial direction is provided on an outer periphery of a stator formed by stacking a plurality of plate-shaped members; a fastening member is inserted in a fastening-member insertion hole formed in the projecting part to fix the stator to the frame; and an outer peripheral surface of the stator excluding the projecting part is fixed by shrink fitting to an inner peripheral surface of the frame, the stator fixing structure characterized in that a dent is formed at a root of the projecting part.

A stator fixing structure according to a second aspect of the invention for solving the above problems is the first aspect, characterized in that which the dent is shaped to extend toward a center of the projecting part in a circumferential direction from an end portion of the projecting part in the circumferential direction, and an inner peripheral surface of the dent is formed as an extension of an outline of the outer periphery of the stator.

A stator fixing structure according to a third aspect of the invention for solving the above problems is the first aspect, characterized in that the dent is shaped to extend toward an inner side of the stator in the radial direction from an end portion of the projecting part in a circumferential direction, and an inner peripheral surface of the dent is formed inward of the outer periphery of the stator in the radial direction.

A stator fixing structure according to a fourth aspect of the invention for solving the above problems is the first aspect, characterized in that the dent is shaped to extend toward an outer periphery of the projecting part from an end portion of the projecting part in a circumferential direction.

Effects of the Invention

In the first aspect of the invention, a dent is provided at the root of the projecting part. In this way, the proportion of the projecting part on the outer periphery of the stator is reduced, thereby increasing the area of contact between the outer peripheral surface of the frame and the inner peripheral surface of the stator. Accordingly, the force of fastening the stator to the frame can be increased. In addition, since the dent is provided at the root of the projecting part, the deformation of the stator by the constricting force can be suppressed.

Also, since there is no need to determine conditions for fixing the stator by taking swaging force and tight fixing force into consideration, there should be no problem in the manufacturing.

Moreover, in the second aspect of the invention, the outline of the inner peripheral surface of the dent and the outline of the outer periphery of the stator excluding the projecting part are the same. In this way, the area of contact between the inner peripheral surface of the frame and the outer peripheral surface of the stator is further increased. This allows for an increase in the fastening force of the shrink fitting.

Further, in the third aspect of the invention, the dent is shaped to extend toward the inner periphery of the stator from the end portion of the projecting part in the circumferential direction. In this way, a larger space can be ensured for absorbing the constricting force.

Furthermore, in the fourth aspect of the invention, the dent is shaped to extend toward the outer periphery of the projecting part from the end portion of the projecting part in the circumferential direction. In this way, the strength at the root of the projecting part can be maintained.

BRIEF DESCRIPTION OF THE DRAWINGS

FIG. 1 is a cross-sectional view of a stator fixing structure inside a general motor.

FIG. 2 is an explanatory view of a stator fixing structure using fastening members according to a conventional technique.

FIG. 3 is an explanatory view of a stator fixing structure according to Embodiment 1 of the present invention.

FIG. 4 is an explanatory view of a stator fixing structure according to Embodiment 2 of the present invention.

FIG. 5 is an explanatory view of a stator fixing structure according to Embodiment 3 of the present invention.

MODES FOR CARRYING OUT THE INVENTION

As shown in FIG. 1, in a motor which is a general rotary machine, a stator 1 formed by stacking multiple plate-shaped members (electromagnetic steel sheets) is placed inside a frame 8, a rotor 6 is disposed inside the stator 1 with a given clearance therebetween, and a shaft 5 supporting this rotor 6 penetrates rotatably through the frame 8 with bearings 10 interposed therebetween.

Moreover, tooth parts 1a on which to wind coils 9 are formed on the inner peripheral side of the stator 1, while projecting parts 2 projecting in the radial direction are provided on the outer periphery of the stator 1. The stator 1 is fixed to the frame 8 by inserting fastening members (e.g. bolts) into fastening-member insertion holes 3 formed in these projecting parts 2. At the outer periphery of the stator 1, the outer peripheral surface of the stator 1 excluding the projecting parts 2 and the inner peripheral surface of the frame 8 are fixed to each other by shrink fitting with a given interference. The contacted portions of the outer peripheral surface of the stator 1 and the inner peripheral surface of the frame 8 fixed by shrink fitting as described above are referred to as shrink-fitted portions 7.

Here, as shown in FIG. 1, a stator fixing structure of the present invention is a stator fixing structure using both fastening with fastening members like that in FIG. 2 of Patent Document 1 and fastening by shrink fitting like that in FIG. 1 of Patent Document 2, and is characterized particularly by providing dents at the root of each projecting part 2. In sum, each projecting part 2 is shaped to dent in the circumferential direction at the root, so that the skirts of the projecting part 2 are narrowed. Specific examples will be described with reference to embodiments shown in drawings.

Note that the following is a method of fixing the stator 1 and the frame 8.
(1) Heating the frame 8 up to a predetermined temperature.
(2) Inserting the stator 1 into the heated frame 8 and fixing them with the fastening members 11.
(3) Cooling the frame 8 and the stator 1.

Embodiment 1

FIG. 3 shows a stator fixing structure according to Embodiment 1 of the present invention. As shown in FIG. 3, this embodiment involves providing dents 4 at opposite end portions of the root of each projecting part 2.

Each dent 4 is shaped to extend toward the center of the projecting part 2 from the end portion of the projecting part in the circumferential direction. Further, the inner peripheral surface of the dent 4 is formed along the outer periphery of the stator 1.

According to this embodiment, the dents 4 provided to each projecting part 2 of the stator 1 eliminate the curved portions which would otherwise be formed from the root of the projecting part 2 along the outer periphery of the stator excluding the projecting part. For this reason, the proportion of the projecting part 2 on the outer periphery of the stator 1 is reduced, thus making it possible to utilize the reduced portion as the interference of the shrink fitting. Thus, the shrink-fitted portions 7 become larger, thereby increasing the area utilizable as the interference for fixing the frame 8 and the stator 1 at the shrink-fitted portions 7, in other words, increasing the area of contact between the outer peripheral surface of the frame 8 and the inner peripheral surface of the stator 1 as shown in FIG. 3. Accordingly, it is possible to increase the force of fastening the stator 1 to the frame 8.

Meanwhile, if the fastening force of the shrink fitting is too strong, the stress produced by the constriction escapes to portions (projecting parts 2) other than the shrink-fitted portions. Even if the fastening force of the shrink fitting is too strong, the dents 4 provided at the root of each projecting part 2 serve as portions for the constricting force to escape, thereby making it possible to absorb and disperse such constricting force applied to the stator 1. Accordingly, it is possible to suppress the deformation of the stator 1 by the constricting force.

In addition, the diameter to the outline of the inner peripheral surface of each dent 4 and the diameter to the outline of the outer periphery of the stator excluding the projecting part 2 are the same. Thus, the proportion of the projecting part 2 on the outer periphery of the stator 1 is further reduced, thereby increasing the areas utilizable as the shrink-fitted portions 7. Accordingly, the area of contact between the inner peripheral surface of the frame 8 and the outer peripheral surface of the stator 1 is further increased. This allows for an improvement in the fastening force of the shrink fitting.

As described above, according to this embodiment, the dents 4 provided to each projecting part 2 increase the area of contact between the inner peripheral surface of the frame 8 and the outer peripheral surface of the stator 1, thereby improving the fastening force of the fixing by shrink fitting. Moreover, the dents 4 of the projecting part 2 absorb and disperse the constricting force from the frame 8. This allows for prevention of the deformation of the stator 1.

Embodiment 2

FIG. 4 shows a stator fixing structure according to Embodiment 2 of the present invention. As shown in FIG. 4, this embodiment involves providing dents 4a at opposite end portions of the root of each projecting part 2.

Each dent 4a is shaped to extend toward the inner periphery of a stator 1 in the radial direction from the end portion of the projecting part 2 in the circumferential direction. Further, the inner peripheral surface of the dent 4a is formed inward of the outer periphery of the stator 1 in the radial direction.

As in Embodiment 1, since the dents 4a are provided at the opposite end portions of the root of each projecting part 2 in this embodiment, the area of contact between the outer peripheral surface of a frame 8 and the inner peripheral surface of the stator 1 at shrink-fitted portions 7 is increased, in other words, the area of contact between the inner peripheral surface of the frame 8 and the outer peripheral surface of the stator 1 is increased. This allows for an increase in the force of fastening the stator 1 to the frame 8, and also absorption and dispersion of the stress produced by the constricting force of the frame 8 which in turn prevent the deformation of the stator 1.

This embodiment allows for a larger space ensured for absorbing the constricting force resulting from the shrink fitting, particularly because the inner peripheral surface of each dent 4a is formed inward of the outer periphery of the stator 1 in the radial direction.

Embodiment 3

FIG. 5 shows a stator fixing structure according to Embodiment 3 of the present invention. As shown in FIG. 5, this embodiment involves providing dents 4b at opposite end portions of the root of each projecting part 2.

Each dent 4b is shaped to extend toward the outer periphery of the projecting part 2 from the end portion of the projecting part 2 in the circumferential direction.

As in Embodiment 1, since the dents 4b are provided at the opposite end portions of the root of each projecting part 2 in this embodiment, the area utilizable as the interference for fixing a frame 8 and a stator 1 at shrink-fitted portions 7 is increased, in other words, the area of contact between the outer peripheral surface of the frame 8 and the inner peripheral surface of the stator 1 is increased. This allows for an increase in the force of fastening the stator 1 to the frame 8, and also absorption and dispersion of the stress produced from the constricting force of the frame 8 which in turn prevent the deformation of the stator 1.

This embodiment allows for maintenance of strength at the root of the projecting part 2 because each dent 4b is shaped to extend toward the outer periphery of the projecting part 2.

INDUSTRIAL APPLICABILITY

The stator fixing structure of the present invention is widely industrially applicable as a fixing structure using both fastening with fastening members and fixing by shrink fitting.

EXPLANATION OF THE REFERENCE NUMERALS 1 stator
2 projecting part
3 fastening-member insertion hole
4, 4a, 4b dent
5 shaft
6 rotor
7 shrink-fitted portion
8 frame
9 coil
10 bearing
11 fastening member

The invention claimed is:
1. A stator fixing structure comprising:
a projecting part projecting in a radial direction from a center of a stator provided on an outer periphery of the stator formed by stacking a plurality of plate-shaped members;
a fastening member inserted in a fastening-member insertion hole formed in the projecting part to fix the stator to a frame;
an outer peripheral surface of the stator excluding the projecting part fixed by shrink fitting to an inner peripheral surface of the frame, the projecting part having a root at a same radial distance from the center of the stator as the outer peripheral surface, the root extending circumferentially in a circumferential direction from a first end portion adjacent a first region of the outer peripheral surface to a second end portion adjacent a second region of the outer peripheral surface;
a first dent formed at the first end portion; and
a second dent formed at the second end portion,
wherein the dents are sized and arranged to increase a contact area between the inner peripheral surface of the frame and the outer peripheral surface of the stator excluding the projecting part,
wherein the first dent and the second dent extend circumferentially without overlapping the fastening-member insertion hole circumferentially,
wherein the dents are configured to be hollow.
2. The stator fixing structure according to claim 1, wherein each of the first dent and the second dent is shaped to extend toward a center of the projecting part in a circum- ferential direction from a respective end portion of the projecting part in the circumferential direction, and
    an inner peripheral surface of each of the first dent and the second dent is formed as an extension of an outline of the outer periphery of the stator.

3. The stator fixing structure according to claim 1, wherein each of the first dent and the second dent is shaped to extend toward an inner side of the stator in the radial direction from a respective end portion of the projecting part in a circumferential direction, and
    an inner peripheral surface of each of the first dent and the second dent is formed inward of the outer periphery of the stator in the radial direction.

4. The stator fixing structure according to claim 1, wherein each of the first dent and the second dent is shaped to extend toward an outer periphery of the projecting part from a respective end portion of the projecting part in a circumferential direction.

\* \* \* \* \*